(12) United States Patent
Ronchi

(10) Patent No.: US 6,852,293 B1
(45) Date of Patent: Feb. 8, 2005

(54) PROCESS AND DEVICE FOR WASTE PYROLYSIS AND GASIFICATION

(75) Inventor: Domenico Ronchi, Bergamo (IT)

(73) Assignee: RGR Ambiente-Reattori Gassificazione Rifiuti S.r.l., Verona (IT)

( * ) Notice: Subject to any disclaimer, the term of this patent is extended or adjusted under 35 U.S.C. 154(b) by 212 days.

(21) Appl. No.: 10/048,171
(22) PCT Filed: Jul. 11, 2000
(86) PCT No.: PCT/EP00/06791
§ 371 (c)(1), (2), (4) Date: Jan. 29, 2002
(87) PCT Pub. No.: WO01/09270
PCT Pub. Date: Feb. 8, 2001

(30) Foreign Application Priority Data

Jul. 29, 1999  (IT) ......................... MI99A1694

(51) Int. Cl.[7] ............................................... F01N 3/00
(52) U.S. Cl. ..................... 422/198; 588/10; 422/198; 422/168; 422/184.1; 422/186.21; 422/186.22; 20/27; 20/35; 423/201; 48/198.8; 48/197 A; 48/DIG. 2; 110/346; 110/229; 110/250
(58) Field of Search .................. 422/198, 168, 422/184.1, 186.21, 186.22; 110/346, 229, 250; 48/198.8, 197 A, DIG. 2; 423/207; 201/27, 35; 588/10

(56) References Cited

U.S. PATENT DOCUMENTS

| | | | | |
|---|---|---|---|---|
| 3,716,339 A | * | 2/1973 | Shigaki et al. .............. | 422/173 |
| 3,761,568 A | | 9/1973 | Brink et al. | |
| 3,861,332 A | | 1/1975 | Itasaka | |
| 4,770,109 A | * | 9/1988 | Schlienger .................. | 110/247 |
| 4,831,944 A | * | 5/1989 | Durand et al. .............. | 110/346 |
| 4,998,486 A | * | 3/1991 | Dighe et al. ................. | 110/346 |
| 5,143,000 A | * | 9/1992 | Camacho ..................... | 110/250 |
| 5,406,047 A | * | 4/1995 | Katschinski et al. ... | 219/121.52 |
| 5,439,498 A | * | 8/1995 | Bitler et al. ............... | 75/10.19 |
| 5,461,991 A | * | 10/1995 | Wagner ...................... | 110/346 |
| 5,550,312 A | * | 8/1996 | Schingnitz et al. ......... | 588/205 |
| 5,637,127 A | * | 6/1997 | McLaughlin et al. ...... | 65/134.8 |
| 5,685,244 A | * | 11/1997 | Goldfarb et al. ............ | 110/346 |
| 6,311,629 B1 | * | 11/2001 | Marschner et al. ......... | 110/341 |

FOREIGN PATENT DOCUMENTS

| | | |
|---|---|---|
| GB | 1 349 910 | 4/1974 |
| GB | 2 001 419 | 1/1979 |

* cited by examiner

*Primary Examiner*—Glenn Caldarola
*Assistant Examiner*—Alexis Wachtel
(74) *Attorney, Agent, or Firm*—Oblon, Spivak, McClelland, Maier & Neustadt, P.C.

(57) ABSTRACT

A process is disclosed for the pyrolysis and gasification of waste materials, in particular of special and/or hazardous waste materials, comprising a gasification and melting step, a step of treatment of the mixture of the obtained gases, and a vitrification step, wherein said steps provide for the following passages: a) the material to be treated, at a temperature comprised between 1300 and 1500° C., is gasified for a lapse of time comprised between 3 and 15 seconds, and melt for a time comprised between 5 and 30 minutes, in total absence of air, obtaining a mixture of combustible gases, non-combustible gases and inert gases, through at least two gasification steps carried out in a sequence, wherein the temperature is maintained constant through the use of at least one thermal lance in any one of the gasification steps; b) the mixture of combustible and non-combustible gases thus obtained is subjected to purification and energy-recovery treatments; c) the inert gases, or inorganic and mineral proportion, are extracted in vitrified state. Further on, a device for carrying out such process is disclosed.

14 Claims, 3 Drawing Sheets

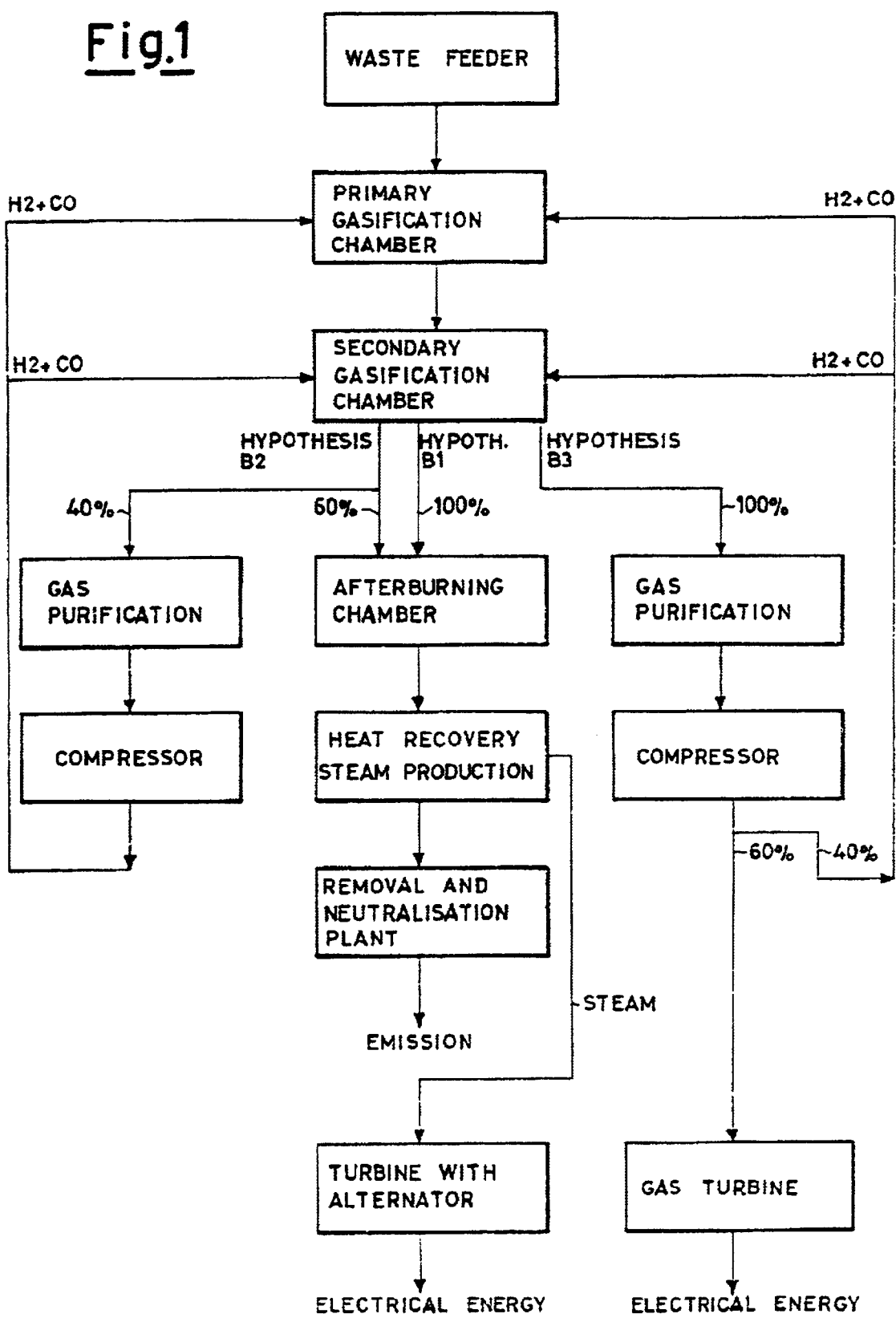

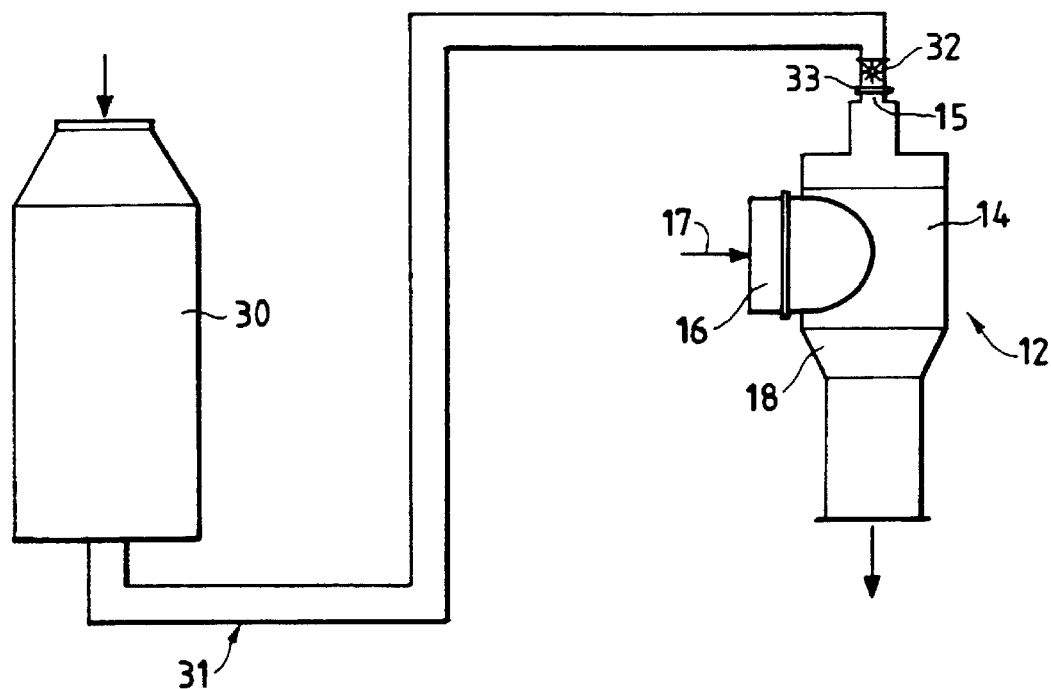
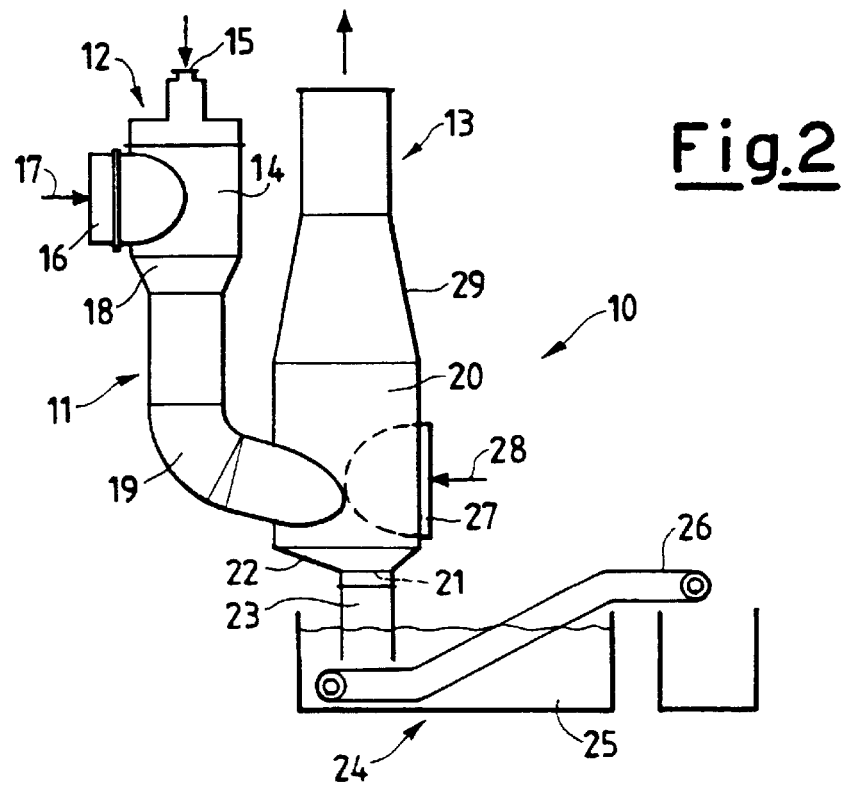

PROCESS AND DEVICE FOR WASTE PYROLYSIS AND GASIFICATION

The present invention relates to a process and a device for the pyrolysis and gasification of waste materials, in particular for special and/or hazardous waste materials.

The problem of the disposal of waste materials, and in particular the problem of disposing of waste classified as special and/or dangerous solid, liquid and/or muddy waste, has been known for a long time, and it has acquired an ever-increasing importance due to the ever-increasing quantity of waste produced both industrially and not, and due to the increasingly binding conditions imposed by the law for the disposal of the same.

The prior art has attempted to solve said problem through the use of different types of plants which make use of pyrolysis, or gasification, or in general, of combustion processes, at determined temperature conditions, then followed by suitable treatment methods for the produced gases. The term "gasification" means a process of partial non-catalytic oxidation of a solid, liquid or gaseous substance, whose final object is that of producing a gaseous fuel mainly consisting of CO, $H_2$, and secondarily of light hydrocarbons, such as methane. Water and carbon dioxide are used as oxidising agents.

On the other hand, the expression "pyrolysis and gasification" refers to a process which breaks up the molecules of organic substances, thermally decomposing them without requiring oxidising agents. EP-B1-0 292 987 describes a process and a device for transforming polluting fuels or waste materials into clean energy and usable products. The process provides for a treatment of the waste material at a temperature of at least 1600° C., in absence of air, so as to obtain a combustible gas based on $H_2$ and CO, non-combustible and inert gases, then a sudden cooling so as to separate inert gases with water, generating vapour and bringing the gases to a temperature not lower than 1200° C., followed by a passage of the vapour and of the gases through a depurative coal mass, and finally, it provides for the cooling of the gases coming from the depurative coal mass.

Nevertheless, the process and the device described in EP'987 do not allow attaining the desired result, that is to say, the complete transformation of solid, liquid and gaseous waste into clean energy and usable products. In fact, the products obtained with the process and the device according to EP'987 contain a high quantity of unburnt products and of air, and there is a high proportion of coal residual. Moreover, the service life of the reactor is extremely limited, as it does not even reach two years time (which is the minimum lifetime for an apparatus of this type) due to the continuous scouring of the refractory material forming the interior of the combustion chamber. Moreover, the depurative coal mass can be very easily obstructed by unburnt residuals and by the coal fraction, and this causes the block of the entire process and device.

The present invention intends to overcome the disadvantages present in the prior art.

In particular, object of the present invention is a process for the pyrolysis and gasification of waste materials, in particular of special and/or hazardous waste materials, comprising a gasification and melting step, a step of treatment of the mixture of the obtained gases, and a vitrification step, characterised in that the above steps provide for the following passages:

a) the material to be treated, at a temperature comprised between 1300 and 1500° C., is gasified for a lapse of time comprised between 3 and 15 seconds, and melt for a time comprised between 5 and 30 minutes, in total absence of air, obtaining a mixture of combustible gases, non-combustible gases and inert gases, through at least two gasification steps carried out in a sequence, wherein the temperature is maintained constant through the use of at least one thermal lance in any one of the gasification steps;

b) the mixture of combustible and non-combustible gases thus obtained is subjected to purification and energy-recovery treatments;

c) the inert gases, or inorganic and mineral proportion, are extracted in vitrified state.

In particular, the treatment step b) of the gas mixture coming from step a) can provide, in alternative, for the following passages:

b1) the totality of the gas mixture is sent to an afterburning chamber for the heat recovery and the production of thermal energy, in the vapour state, which is then recovered and transformed into electrical energy;

b2) part of the gas mixture is purified through cooling, filtering, neutralisation, adsorption of $CO_2$ and compression, and the gas mixture thus treated is fed to the thermal lances so as to maintain the predetermined temperature into the gasification chambers, in alternative and/or in parallel to the traditional fuel, whereas the remaining portion of gas is sent to the treatment provided at item b1);

b3) the totality of the gas mixture is subjected to step b2), and portion of the gas mixture thus treated is fed to the thermal lances so as to maintain the predetermined temperature into the gasification chambers, whereas the remaining portion (more than 50%) is sent to an electrical energy recovery treatment.

The mixture of the gases coming from the gasification reaction consists of CO, $CO_2$, H, and $H_2O$, and it can be used differently according to the size of the plant and to the predetermined energetic objects. The gas mixture which may still be present at the end of step b1) is sent to a removal and neutralisation system so that the emission into the atmosphere occurs in compliance with precise law provisions.

Moreover, further object of the present invention is a device for carrying out the process according to the present invention, characterised in that it comprises one or more stocking systems, for the waste to be treated in connection—through a transport and feeding system—with a reactor, said reactor consisting of at least one primary gasification chamber, connected to a secondary and melting gasification chamber, each gasification chamber being provided With at least one thermal lance, said secondary and melting gasification chamber being provided, at one end, with a system for sending the gases to successive steps, and at the opposed end, with a system for discharging the melt material to a vitrification system.

In particular, the thermal condition in the primary and secondary and melting gasification chambers is reached through the use of suitable thermal lances fed with traditional fuels, such as methane, propane, etc., and/or with the mixture of $H_2$ and CO coming from the process according to the present invention. The operating temperature in the chambers must be maintained at the value of 1300–1500° C., since this allows attaining the gasification of the organic proportion of the material to be treated at the maximum speed possible, and the melting of the inorganic mineral proportion, so as to carry out, afterwards, its extraction in vitrified state.

In fact, the extraction in vitrified state is essential for the objects of the present invention since metal and inorganic residuals exhibit stability, insolubility and inertia to the ambient, thanks to the vitreous state and to its high inertness degree.

Moreover, the use of said temperatures also allows solving the problem of the scouring of the refractory materials inside the reactor.

The systems for stocking the waste to be treated generally consist of silos sized according to the hourly flow rate of the plant so as to guarantee the maintenance of the necessary autonomy.

The stocking containers are made completely airproof or they are maintained at a pressure equal to or lower than the operating pressure of the gasification chamber.

In fact, independently of the physical nature of the waste (liquid, solid, muddy), said condition is necessary for preventing the introduction of air into the primary gasification chamber.

In particular, liquid waste is fed by means of special atomisation lances by mean-head pumps, with flow-rate control.

Muddy waste can be fed under flow-rate control through screws or suitable pumps, such as for example single-screw pumps, pistons, etc.,.

Solid waste must be pre-treated before being charged into the feeding silo. In fact, its expected size is about 2–3 cm. In any case, the preventive treatment depends on the nature of the solid waste, and on its content.

The waste is fed into the primary gasification chamber through simple or combined transport systems.

The material to be treated is extracted from the silo and transported, always by systems made totally airproof, to a shutoff valve arranged vertically above the inlet area of the primary gasification chamber. Then, the waste is fed, always under flow-rate control, by means of a motorised stellar valve (or other equivalent devices), without compressions which may increase its density, so that in the point of inlet to the primary gasification chamber, it is as fluid as possible.

As previously indicated, the reactor is divided into two sections:

one (or more) primary gasification chamber(s);
a secondary and melting gasification chamber.

The primary gasification chamber consists of a vertical cylinder provided with an aperture, or mouth, for charging the waste, at the centre of the cover of said cylinder. Always in the high portion of the cylinder, but with tangential clutch, there is provided the introduction point of the thermal lance. The lower portion of the cylinder is tapered as a truncated cone so as to connect the cylinder to the pipeline which connects it to the secondary and melting gasification chamber. The volume and length of the cylinder and of the union pipeline determine the time of permanence of the waste in contact with the hot gases generated by the thermal lance, and with the surface of the refractory coating maintained at the expected operating temperature (1300–1500° C.). The cylinder has a volume ranging between 0.4 m$^3$ and 16 m$^3$, and its length ranges between 1.5 m and 6 m, whereas the connection system, or union pipeline, has a volume ranging from 0.06 m$^3$ to 9 m$^3$ and a length ranging from 1.5 m to 5 m.

The gas flow generated in the primary gasification chamber forms a descending flow which tangentially enters into the secondary and melting gasification chamber, together with the portion of fed waste yet to be gasified or melt.

Also the secondary and melting gasification chamber consists of a vertical cylinder arranged at a lower level with respect to the first chamber. The lower portion of said cylinder constitutes the bottom, or melt basin, of the waste mineral residuals. The refractory coating of said bottom is laid so as to obtain an inclination or slope comprised between 5 and 30%, preferably of 20%, between the highest point (inlet area of the gases from the previous chamber) and the lowest point, diametrically opposed (outlet area of melt ashes). Moreover, the bottom exhibits a length ranging between 1.5 and 3 meters.

The length and the inclination of this path determine the time of permanence and, accordingly, the melting of the gasification residuals. On the wall of the cylinder of the secondary and melting gasification chamber, always in the proximity of the bottom, there is provided the second thermal lance, which has the task of maintaining the operating temperature at the predetermined condition (1300–1500° C.). Such lance is arranged as tangential inlet. In this way, besides accomplishing the melting, the gasification is completed, and since it occurs in two sequential steps, it is characterised by very high efficiency levels.

The upper portion of the cylinder forming the secondary and melting gasification chamber ends as a truncated cone connected to the pipeline which conveys the gases to the following treatments. The descending flow arriving from the primary chamber changes into ascending flow into the secondary chamber, in a high turbulence condition generated by the tangential inlets.

Thus, the gas mixture coming from the first gasification chamber consists of a descending flow that changes into ascending flow in the second gasification step, in a high turbulence condition generated by the tangential inlets.

The discharge of melt material occurs through a special aperture arranged in the peripheral portion of the bottom of the secondary and melting gasification chamber. The melt material directly arrives into an underlying basin, maintained at a constant water level. In this way, a hydraulic seal is also created, which prevents the air from entering into the secondary and melting gasification chamber. The vitrified material is continuously removed from the basin through a special bucket elevator. In particular, the device according to the present invention can be provided with two or more primary gasification chambers which converge to a single secondary and melting gasification chamber.

In fact, in the case of a plant where it is necessary to maximise the flow rate of a single waste, or where there is the need of feeding at the same time waste of different nature, the realisation of two (or even three) primary chambers converging, with equal geometry, to the same secondary chamber is an extremely useful solution.

In this way, there must be provided a double charging system to the two primary chambers with the possibility of proportioning on the basis of the waste quality or of the disposal requirements.

In the secondary chamber, on the basis of the diameter of the same, it can be necessary to install more than one thermal lance so as to better distribute the heat generated by the same lances. In fact, a single lance with high power could subject the refractory coating to too high thermal stresses (temperature peaks) which would significantly reduce its lifetime.

Thermal lances are usually fed with traditional fuel and/or with the H$_2$ and CO mixture generated by the plant. They are controlled by a totally automatic system which allows passing from 0% to 100% of both types of fuel. The quantity of oxygen, as single comburent, is stoichiometrically controlled on the basis of the quantity of fuel and of its calorific value (in the case of mixture). Each installed lance is provided with a control and regulation system.

It allows using the traditional fuel in the steps of start-up and of attainment of the operating temperature, whereas from the moment in which the waste is introduced and consequently, the production of the gas mixture starts, it becomes possible to gradually (0–100%) feed the gas mixture to the lance, decreasing at the same the traditional fuel according to an still gradual manner (100–0%). The self-support of the process is thus attained.

As previously indicated, the gas mixture exiting from the secondary and melting gasification chamber undergoes different treatments on the basis of the type of use for which it is intended.

The process according to the present invention allows realising a process of total disposal of the material to be treated with the maximum efficiency and in total safety.

A further advantage consists in the possibility of self-support of the thermal lances, which makes the process and the apparatus according to the present invention particularly advantageous.

Further features and advantages of the present invention will appear more clearly evident from the following description. This is an exemplifying and not limitative description, which refers to the attached drawings. In such drawings:

FIG. 1 shows a block diagram of the process according to the present invention;

FIG. 2 shows a schematic side elevation view of an apparatus according to the present invention, in a first embodiment;

FIG. 3 shows a side elevation view of a portion of the apparatus according to the present invention;

Figure 4:
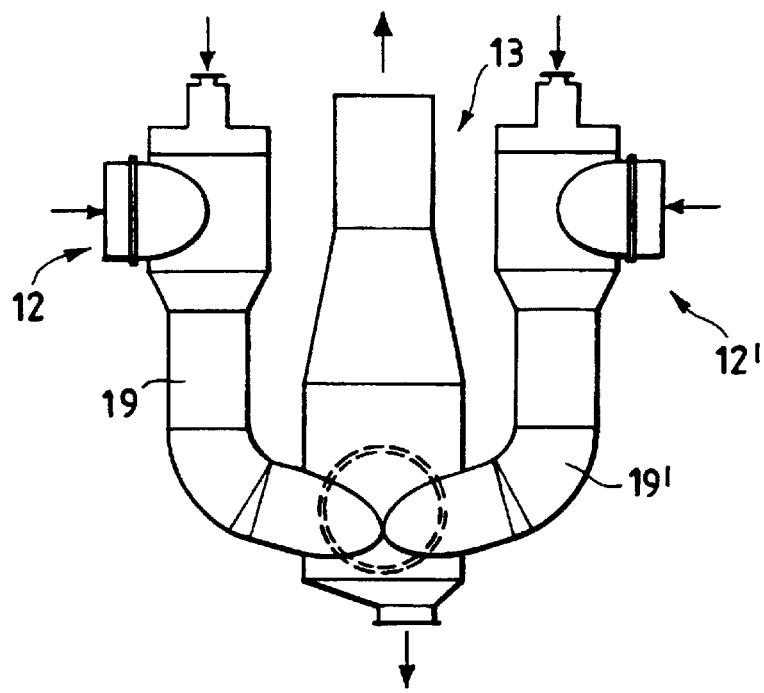
FIG. 4 shows a schematic side elevation view of an apparatus according to the present invention, in a second embodiment.

With reference to FIG. 2, reference numeral 10 indicates as a whole the device according to the present invention. It consists of a waste stocking silo which, through a transport system, not shown in FIG. 2, is connected to a reactor 11, which comprises a primary gasification chamber 12 and a secondary and melting gasification chamber 13.

Said primary gasification chamber 12 consists of a cylinder 14, provided with an aperture 15 into the upper cover, a tangential clutch 16 of a thermal lance 17, a lower portion tapered as truncated cone 18, connected to a connection system 19 which enters into the secondary and melting gasification chamber 13.

In particular, in the dimensional embodiment shown in FIG. 2, cylinder 14 exhibits a volume equal to 0.41 m$^3$ and a length of 2 m, whereas the connection system 19 has a volume equal to 0.06 m$^3$ and a length of 1.5 m.

Said secondary and melting gasification chamber 13 consists of a cylinder 20, provided with an aperture 21 into the lower bottom 22. The lower bottom 22 is provided with an inclination that can range between 5 and 30%, and a length ranging between 1.5 and 3 m, in particular in the embodiment represented in FIG. 2, bottom 22 exhibits an inclination of 20% and a length of 1.5 m.

Aperture 21 allows the outlet of the melt material, through a discharge system 23, to a vitrification system 24.

The vitrification system 24 comprises a basin 25 and an extraction system 26 for the vitrified residuals. Moreover, in the lower portion, cylinder 20 is provided with the tangential clutch of the connection system 19 coming from the primary gasification chamber 12 on the one side, and at the opposed side, with a tangential clutch 27 of a thermal lance 28 and an upper portion tapered as truncated cone 29, connected to a system for delivering the gases to the following treatment steps.

In particular, FIG. 3 shows a stocking silo 30 which, by means of a transport system 31 moved by a stellar valve 32, through a shutoff valve 33 takes to the primary gasification chamber 12.

FIG. 4 shows a further embodiment of the device according to the present invention, which provides for two primary gasification chambers 12 and 12', connected to two connection systems 19 and 19', which enter into the secondary and melting gasification chamber 13.

Figure 5:
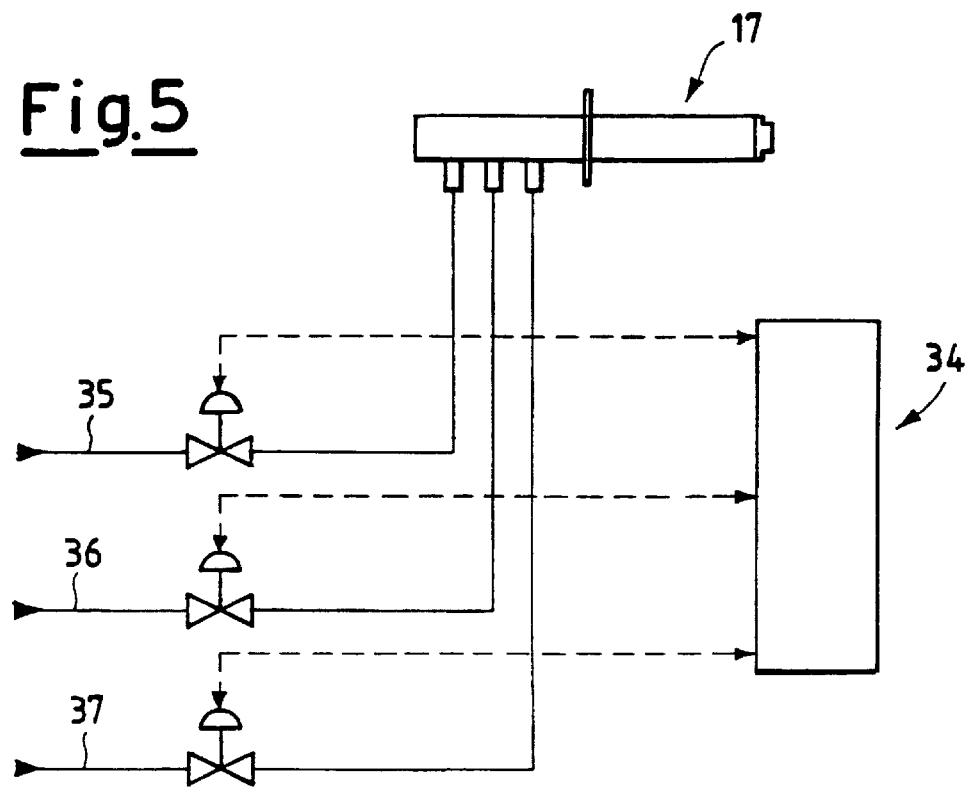
FIG. 5 shows an example of thermal lance used in the process and in the device according to the present invention.

On the other hand, FIG. 5 shows a thermal lance 17, with the relevant control and regulation system 34, which allows feeding the thermal lance only with traditional fuel (methane) 35 and oxygen 36, or only with the gases produced during the gasification and pyrolysis process 37, and oxygen 36, or with any other mixture of traditional fuel and of the gases produced with the process according to the present invention.

The following examples show two applications of the process according to the present invention.

EXAMPLE 1

The plant has been fed with 307 kg/h of C.D.R. (Fuel Obtained from Waste) with a calorific power lower than 5184 kcal/kg; the cracking process has occurred in a complete way, and this results both from the composition of the produced gas and from the composition state of the cinders, which are completely vitrified.

The medium composition of the produced gas is as follows:

| $H_2$ | CO | $CO_2$ | $CH_4$ | $H_2O$ | Flow rate (Nm$^3$/h) |
|---|---|---|---|---|---|
| 37 | 35 | 12 | 3 | 14 | 530 |

The process has been carried out at a temperature of about 1650 K (1377° C.), and the energy balance of the plant is equal to 80%.

EXAMPLE 2

The plant has been fed with tyres coming from tyre demolition. 232 kg/h of tyres with calorific power of 8114.kcal/kg have been charged.

The medium composition of the produced gas is as follows:

| $H_2$ | CO | $CO_2$ | $CH_4$ | $H_2O$ | Flow rate (Nm$^3$/h) |
|---|---|---|---|---|---|
| 44.5 | 35 | 9 | 2.7 | 9 | 642 |

The process has been carried out at a temperature of about 1600 K (1327° C.), and the energy balance of the plant is equal to 88%.

What is claimed is:

1. A device for carrying out a process of pyrolysis and gasification of special and/or hazardous waste materials, comprising:

one or more stocking systems, for the waste materials to be treated in connection through a transport and feeding system, with a reactor, said reactor consisting of at least one primary gasification chamber, connected to a secondary and melting gasification chamber, each gasification chamber being provided with at least one thermal lance, said secondary and melting gasification chamber being provided, at one end thereof, with a system for supplying the gases to successive steps, and at the opposite end thereof, with a system for discharging the melt material to a vitrification system.

2. The device according to claim 1, wherein said primary gasification chamber consists of a cylinder, provided with an aperture into the upper cover, a tangential clutch of a thermal lance, a lower portion tapered as truncated cone, connected to a connection system which enters into the secondary and melting gasification chamber.

3. The device according to claim 2, wherein the cylinder has a volume equal varying from 0.4 m$^3$ to 16 m$^3$ and a length varying from 1.5 m to 6 m.

4. The device according to claim 2, wherein the connection system has a volume varying from 0.06 m$^3$ to 9 m$^3$ and a length varying from 1.5 m to 5 m.

5. The device according to claim 1, wherein said secondary and melting gasification chamber consists of a cylinder, that foresees an aperture into the lower bottom, said cylinder being provided in its lower portion on the one side with the tangential clutch of the connection system coming from the primary gasification chamber, and at the opposite side, with a tangential clutch of a thermal lance and being further provided with an upper portion tapered as truncated cone, connected to a gas delivering system.

6. The device according to claim 5, wherein the lower bottom is coated with a refractory coating, so laid as to obtain an inclination between the highest point corresponding to the inlet area of the gases from the previous chamber and the lowest point, corresponding to the outlet area of melt ashes comprised between 5 and 30% and a length comprised between 1.5 m and 3 m.

7. The device according to claim 6, wherein the inclination of the refractory coating is 20% and its length is 1.5 m.

8. The device according to claim 5, wherein the aperture for the outlet of the melt material, is connected, through a discharge system, to a vitrification system, said vitrification system comprising a basin and an extraction system for the vitrified residuals.

9. The device according to claim 8, wherein the basin is maintained at a constant water level that builds up a hydraulic seal that prevents air from entering into the secondary and melting gasification chamber and inn that the extraction system consists of a bucket elevator for the continuous removal of the vitrified material.

10. The device according to claim 1, wherein the thermal lances are connected to the gasification chambers by means of a tangential clutch.

11. The device according to claim 1, wherein the systems for stocking the waste to be treated consist of silos sized according to the hourly flow rate of the plant and are completely airproof or maintained at a pressure equal to or lower than the operating pressure of the gasification chamber.

12. The device according to claim 1, wherein the device foresees at least two primary gasification chambers.

13. The device according to claim 1, wherein the device foresees at least two thermal lances for the secondary and melting gasification chamber.

14. The device according to claim 1, wherein each thermal lance is provided with a control and regulation system.

* * * * *